J. M. FEENEY.
FOOD CHOPPER.
APPLICATION FILED APR. 25, 1921.
1,399,295.
Patented Dec. 6, 1921.
2 SHEETS—SHEET 2.
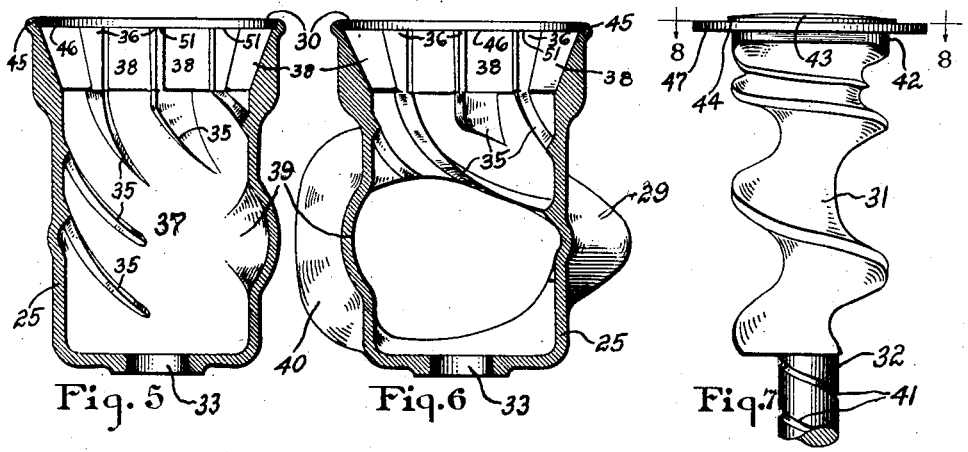
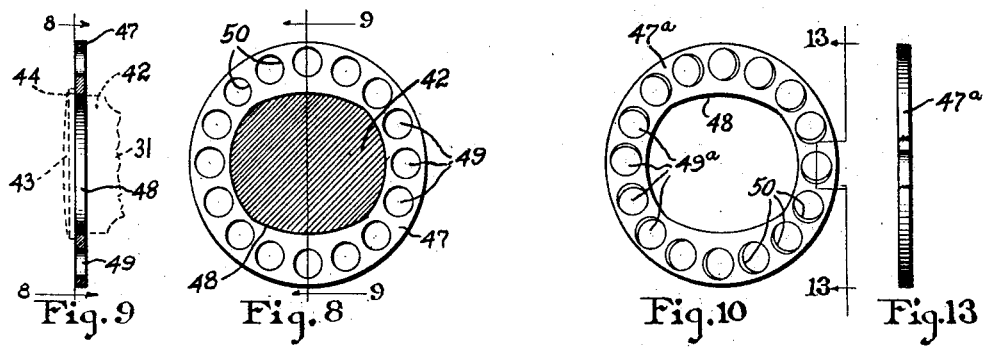
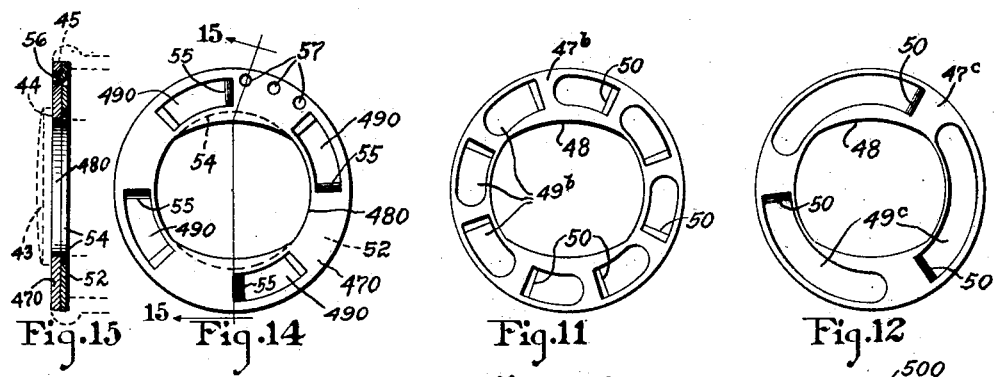
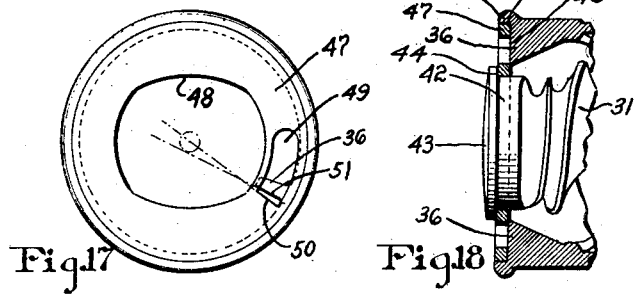
INVENTOR
John M. Feeney
BY
A. M. Wooster
ATTORNEY

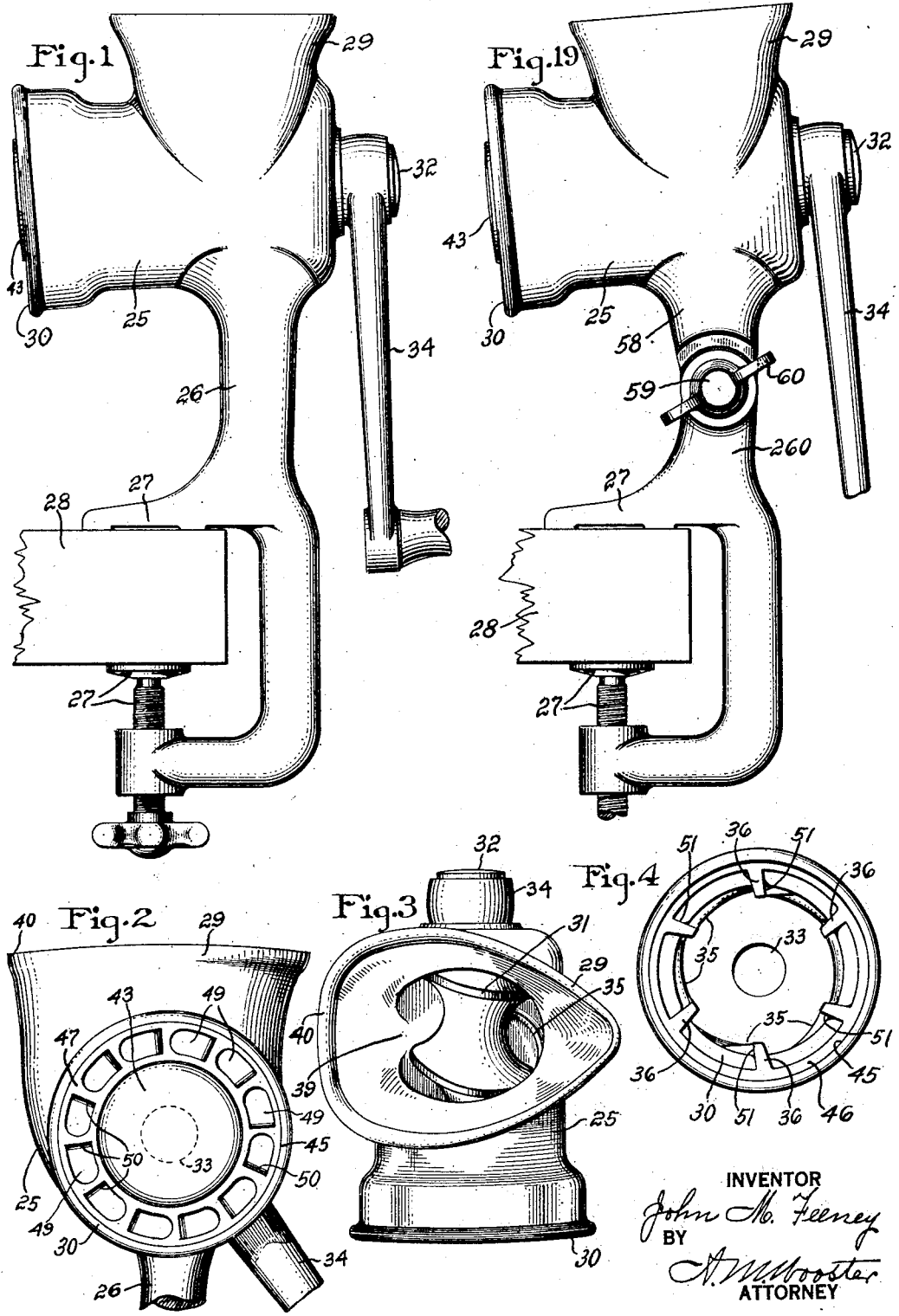

UNITED STATES PATENT OFFICE.

JOHN M. FEENEY, OF BRIDGEPORT, CONNECTICUT.

FOOD-CHOPPER.

1,399,295.   Specification of Letters Patent.   Patented Dec. 6, 1921.

Application filed April 25, 1921. Serial No. 464,270.

*To all whom it may concern:*

Be it known that I, JOHN M. FEENEY, a citizen of the United States, residing at Bridgeport, county of Fairfield, State of Connecticut, have invented an Improvement in Food-Choppers, of which the following is a specification.

This invention relates to meat and other food choppers of the general type comprising a substantially cylindrical body or casing containing a longitudinally disposed feed screw, said casing having at one end a hopper to receive the material to be cut and at the other a discharge opening in which are located coöperating fixed and rotary cutters carried by the casing and feed screw respectively.

The invention has for its general object to provide an improved food chopper of this type which is of simple and inexpensive construction, which is sanitary and easily cleaned, whose parts are so arranged as to facilitate the feeding of the material to be cut and the cutting thereof, which is so constructed as to prevent the escape and waste of the food juices, which may be easily and quickly assembled and disassembled, which will permit the relative fineness or coarseness of cut to be readily varied, and which is otherwise efficient in action, convenient of operation, and easily kept in order.

With the foregoing and other objects in view I have devised the novel food shopper or cutter which I will now describe, reference being had to the accompanying drawing, wherein:

Figure 1 is a side elevation of the complete machine.

Fig. 2 is a front elevation and Fig. 3 a plan view of the head or body thereof.

Fig. 4 is an elevation of the front or outlet end of the body with the rotary cutter and feed screw removed.

Figs. 5 and 6 are central horizontal sections, looking downwardly and upwardly respectively, of the body or casing.

Fig. 7 is a detail view of the combined operating shaft and feed screw.

Fig. 8 is a section on the line 8—8, Fig. 7.

Fig. 9 is a section substantially on the line 9—9, Fig. 8, of the rotary cutter, showing the end of the combined operating shaft and feed screw in dotted lines.

Figs. 10, 11 and 12 are front elevations of a series of interchangeable cutters.

Fig. 13 is a side elevation, partly in section on the line 13—13, Fig. 10, of the cutter shown in the latter figure.

Fig. 14 is a front elevation of an adjustable cutter which may be employed instead of the series of interchangeable cutters shown in Figs. 10 to 13.

Fig. 15 is a section on the line 15—15, Fig. 14.

Fig. 16 is a detail transverse section of a portion of the cutter shown in Fig. 14 taken through one of the openings therein, Fig. 14.

Fig. 17 is a diagrammatic view illustrating the coöperation of the cutting elements on the fixed and rotary cutters.

Fig. 18 is a fragmentary longitudinal section of the front end of the machine.

Fig. 19 is a view similar to Fig. 1 showing a modified construction.

Referring to Fig. 1, 25 denotes the body or casing which is carried at the top of an upright 26 having at its lower end a clamp 27 by which the same may be secured to the edge of a table or other support 28. The casing 25, which is of substantially cylindrical form, is provided adjacent its rear end with a feed hopper 29 opening into the top thereof, and has an open front end to provide a circular discharge opening 30. Within the body or casing 25 is a coaxially disposed feed screw 31 forming part of a shaft 32 journaled in an opening 33 (Figs. 4, 5 and 6) formed in the rear wall of casing, said shaft being provided outside the casing with an operating crank handle 34.

The interior of the body or casing 25 is formed with a series of fixed spiral ribs or teeth 35 terminating at their forward ends in a common, substantially vertical plane adjacent the discharge opening 30 to provide fixed cutting elements 36. The ribs 35 are interrupted at the bottom of the casing to provide a smooth clean-out surface 37 (Fig. 5) from which, when the front of the casing is open, any material remaining therein may be readily wiped or washed out through the space between adjacent cutting elements, as at 38, thereby obviating the difficulty frequently encountered of properly cleaning devices of this character due to the usual continuous ribs behind which matter is apt to lodge and from which it is difficult to remove it.

The ribs 35 are also interrupted at that side of the casing toward which the top of the feed screw 31, adjacent the hopper 29, turns during the normal operation of the machine, to provide a smooth, and preferably slightly outwardly curved or extended feed surface or portion 39. The mouth of the hopper 29 is relatively broader at the side adjacent the feed surface or portion 39, as indicated at 40 in Figs. 3 and 6, this relatively broad portion of the hopper cooperating with the feed surface 39 to facilitate the entry of the material into the machine.

At its rear end adjacent the opening 33 the shaft 32 is formed with a spiral groove 41 whose pitch is in the same direction as that of the feed screw 31, said groove tending to feed forwardly into the casing any food juices which may find their way to the opening 33, and preventing the accidental escape or leakage of said juices at this point.

At its forward end, the shaft 32 is enlarged to substantially the outside diameter of the feed screw 31, and is there formed with an oval or other non-circular portion 42 beyond which is a head 43 providing at its junction with the portion 42 a shoulder 44. The exterior of the casing 25 at the mouth of the discharge opening is formed with a rabbet 45 providing a shoulder 46 lying in the plane of the outer faces of the cutting elements 36. 47 denotes a circular rotary cutting disk having a central non-circular opening 48 shaped substantially to fit the non-circular portion 42 of the shaft 32, said cutting disk, when the shaft is in place, being rotatably held in the rabbet 45 between the shoulders 44 and 46, thereby securely retaining said cutter in place and connecting the same with the shaft 32 for rotation therewith without the use of any attaching means whatsoever, and permitting the ready removal thereof when the shaft is removed. The cutter 47 is of substantially the same diameter as the rabbet 45, only sufficient clearance being provided between the edge of said cutter and the peripheral wall of the rabbet to permit the former to turn easily in the latter, said clearance being less than that provided between the feed screw 31 and the ribs 35 (see Fig. 18) thereby holding the forward end of the shaft 32 properly centered, and preventing binding between said feed screw and ribs.

The cutter 47 is provided with a circular series of openings 49 the edges of which constitute cutting elements coöperating with the fixed cutting elements 36 when said cutter is rotated. As is usual in devices of this character, in order to vary the relative fineness or coarseness of cut a plurality of interchangeable cutters 47$^a$, 47$^b$, 47$^c$ (Figs. 10, 11, and 12), having openings 49$^a$, 49$^b$ and 49$^c$ of different sizes may, if desired, be employed, the readily detachable mounting of said cutters on the shaft 32, as above described, making it possible to make the necessary change of cutters with a minimum expenditure of time and effort.

The walls of the openings 49 may, if desired, be perpendicular to the faces of the disk 47, as shown in Figs. 8 and 9, but preferably the sides thereof constituting the cutting edges are beveled, as shown at 50 in Figs. 10 to 13, in order to facilitate the cutting operation. Also said cutting edges 50 are preferably arranged to engage the cutting edges 51 of the fixed cutting elements 36 at a slight angle. Thus, as shown in Fig. 17, the cutting edges 50 are disposed radially of the axis of the shaft 33, while the cutting edges 51 are disposed at a slight angle to the radii from said axis, so as to cause the coöperating edges of the fixed and movable cutting elements to engage and pass one another in a manner similar to the cutting edges of a pair of shears.

In accordance with the present invention, instead of providing a series of interchangeable cutters having openings of different sizes, there is preferably provided a single cutter having means whereby the effective size of the openings therein may be varied. Thus, there is shown in Figs. 14, 15 and 16 a cutter disk 470 having a central non-circular opening 480 and a circular series of cutting openings 490 corresponding substantially to the openings 48 and 49 in the cutters above described. Associated with the cutter disk 470 is a coaxially disposed adjusting disk 52 corresponding in diameter to the disk 470 and lying immediately in the rear of the same, said adjusting disk having openings 53, corresponding in size and arrangement to the openings 490 in the cutter disk, and a central opening 54 which is circular in form and of a diameter equal to the greatest diameter of the opening 480. The inner face of the cutter disk 470 is provided adjacent the ends of the openings 490 with projections 55 (Fig. 16) which extend into the openings 53 in the disk 52, the sides of said projections being beveled to correspond to the adjacent beveled ends of openings 490, thereby carrying the cutting edges 500 of the cutter disk 470 into the plane of the inner face of the disk 52. It will therefore be seen that the effective size of each opening in the complete cutter is determined by the relative angular positions of the disks 470 and 52 and the consequent positions of the cutting edges 500 with respect to the opposite ends of the corresponding openings 53, so that, by angularly adjusting the disk 52 with respect to the cutter disk 470, the size of the cutter openings may be varied in accordance with the requirements, such angular adjustment of the disk 52 being permitted by the circular opening 64 therein. In order to hold the parts in adjusted position, the disk 52 is provided with a struck-up projection (see Fig. 15) adapted to enter any one of a series of apertures 57 (Fig. 14) in the cutter disk 470. When the machine is in operation, the assembled disks 470 and 52 are held as a unit between the shoulders 44 and 46 on the head 43 and casing 25 respectively, with the disk 52 in close engagement with the rear or inner face of the cutter disk 470, thereby holding the projections 56 in engagement with one of the apertures 57 and preventing relative angular movement of said disks. When, however, it is desired to adjust the cutter, the shaft 32 is removed or moved forwardly (this, as is usual in machines of this type, being permitted by the removal of the crank handle 34), thereby unseating the disk 52 from the shoulder 46 and permitting the same to be moved rearwardly a sufficient amount to disengage the projection 56 from the apertures 57, whereupon said disk may be turned with respect to the cutter disk, to vary the effective size of the cutter openings, after which said projection is engaged with another of said apertures 57.

In order to facilitate the discharge of the cut material from the machine, the body or casing 25 is preferably disposed with its axis slightly downwardly and forwardly inclined as shown in Fig. 1. If desired, and as shown in Fig. 19, said casing 25 may be formed with a short downward extension 58 pivoted at 59 to the supporting upright 260 so as to turn about a horizontal axis transverse to the axis of the casing, the parts being clamped in position by a wing nut 60, whereby the angular position of said casing on said upright, and the consequent inclination of the former, may be adjusted.

Having thus described my invention, I claim:

1. In a food chopper, a substantially cylindrical body having a hopper communicating therewith, a discharge opening at its forward end, and spiral internal ribs interrupted at the bottom of said body to provide a substantially smooth, longitudinally disposed clean-out surface extending to said discharge opening.

2. In a food chopper, a substantially cylindrical body having a hopper communicating therewith and a discharge opening at its forward end, and a feed screw in said body and disposed substantially coaxially thereof, said feed screw being rotatable to carry material through said body from said hopper to said discharge opening, said body having spiral internal ribs interrupted at the side of said hopper toward which the adjacent portion of said feed screw moves during its rotation.

3. In a food chopper a substantially cylindrical body having a hopper communicating therewith, a discharge opening at its forward end, and spiral internal ribs interrupted at the bottom of said body to provide a substantially smooth, longitudinally disposed clean-out surface extending to said discharge opening, and a feed screw in said body and disposed substantially coaxially thereof, said feed screw being rotatable to carry material through said body from said hopper to said discharge opening, and said internal ribs being also interrupted at the side of said hopper toward which the adjacent portion of said screw moves during its rotation.

4. In a food chopper, a substantially cylindrical body having a hopper communicating therewith and a discharge opening at its forward end, and a feed screw within said body and disposed substantially coaxially thereof, said feed screw being rotatable to carry material through said body from said hopper to said discharge opening, said hopper being relatively broader at the side toward which the adjacent portion of said screw moves during its rotation, and said body having spiral internal ribs interrupted at the side of said body adjacent the broader side of said hopper.

5. In a food chopper, a body having a circular discharge opening provided with a rabbet, a rotatable cutter seated in said rabbet and having a non-circular opening, and a shaft in said body having a non-circular portion received in the opening in said cutter and a shoulder engaging the outer face of said cutter.

6. In a food chopper, a body having a circular discharge opening provided with a rabbet, a rotatable cutter seated in said rabbet and having a non-circular opening, and a shaft having a feed screw within said body, said shaft having a non-circular portion received in the opening in said cutter and a shoulder engaging the outer face of said cutter, said cutter having less circumferential clearance in said bearing than that between said body and feed screw.

7. In a food chopper, a body having a wall and an operating shaft extending through said wall and having a bearing therein, said shaft having a spiral groove adjacent said bearing.

8. In a food chopper, a substantially cylindrical body and a shaft journaled in the end of said body and having a feed screw within said body, said shaft having adjacent the end of said body a spiral groove pitched in the same direction as said feed screw.

9. In a food chopper, a body having a discharge opening, a circular series of fixed cutting elements adjacent said opening, and a rotatable cutter having cutting elements coöperating with said fixed cutting elements, the cutting edges of the elements of one of said sets being radially disposed with respect to the axis of rotation of said rotatable cutter, and the cutting edges of the elements of the other of said sets being inclined to the radii of said axis.

10. In a food chopper, a rotary cutter comprising two coaxially disposed disks each having a circular series of openings, said disks being angularly adjustable to vary the effective size of the registering portions of the openings therein.

11. In a food chopper, a rotary cutter disk having a circular series of openings, a coaxially disposed adjusting disk having a circular series of openings corresponding in size and arrangement to the openings in said cutter disk, said cutter disk having adjacent the ends of the openings therein projections extending into the openings in said adjusting disk and having cutting edges, and said disks being relatively angularly adjustable to vary the positions of said projections in the openings in said adjusting disk.

12. In a food chopper, a rotary cutter comprising two coaxially disposed, angularly adjustable disks each having a circular series of openings, one of said disks having a series of apertures and the other of said disks having a projection to engage said apertures and hold said disks in adjusted position.

13. In a food chopper, a body having a discharge opening provided with a shoulder, a shaft having a non-circular portion and a shoulder adjacent said non-circular portion, and a rotary cutter on said shaft and held between the shoulders on said shaft and body, said cutter comprising a cutter disk having a non-circular opening in which the non-circular portion of said shaft is received and a circular series of cutting openings, and an adjusting disk having a circular opening to receive said shaft and a circular series of openings corresponding in arrangement to the cutting openings in said cutter disk, one of said disks having a series of apertures and the other of said disks having a projection adapted to engage any of said apertures to hold said disks against relative angular movement.

In testimony whereof I affix my signature.

JOHN M. FEENEY.